Dec. 28, 1926.
H. W. SANFORD
GREASE GUN CONNECTION
Filed Jan. 27, 1922
1,612,657
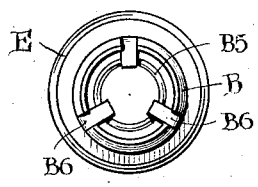
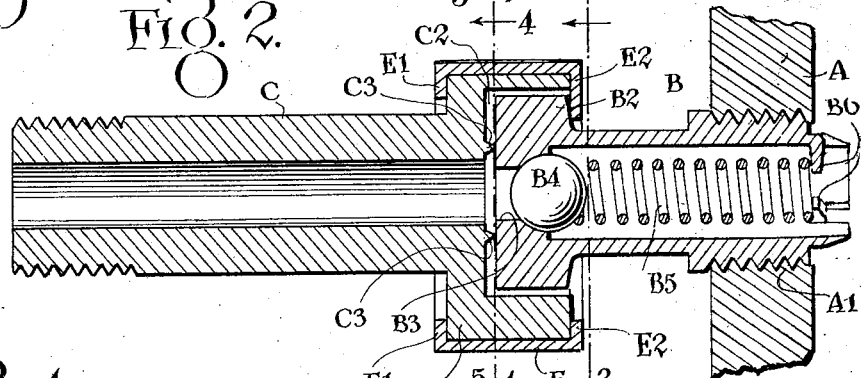
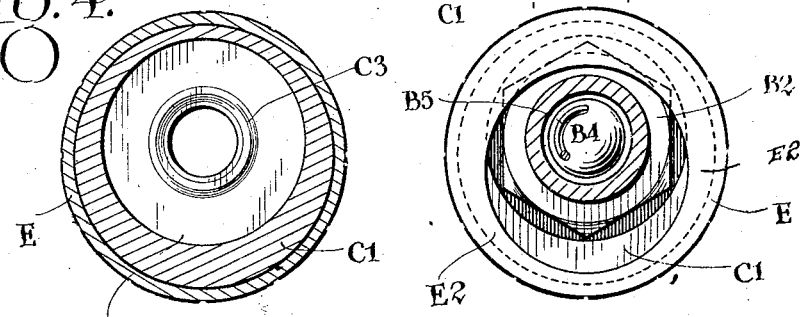
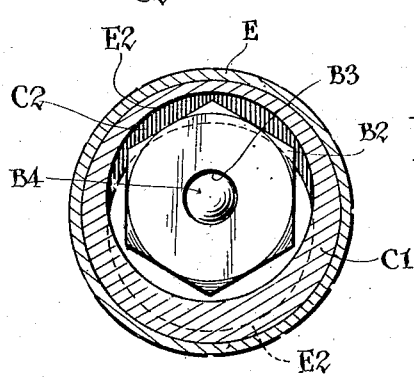
Inventor
Hugh W. Sanford
By Cyrus Kehr
Attorney Patented Dec. 28, 1926.

1,612,657

UNITED STATES PATENT OFFICE.

HUGH W. SANFORD, OF KNOXVILLE, TENNESSEE.

GREASE-GUN CONNECTION.

Application filed January 27, 1922. Serial No. 532,317.

My improvement relates particularly to means for connecting a tube or pipe leading from a grease gun to a screw plug or similar nipple-form structure communicating with a bearing which is to be lubricated by the injection of grease from the gun through said screw plug or other nipple-form member into the bearing.

One object of this invention is to provide a convenient connection or coupling adapted to engage the head on the outer end of the screw plug or similar member. A further object is to provide such a connection or coupling in a form adapted to make close engagement around the orifice of the screw plug, even though the face around said orifice is covered with dirt or grit or other foreign matter, in order that the grease may be directed into said orifice without lateral leakage.

The coupling or connection may be directly on the body of the grease gun, or it may be on a tube or pipe of any convenient length leading from the body of the gun to the screw plug.

In the accompanying drawings.

Fig. 1 is a sectional elevation of the members forming the coupling;

Fig. 2 is a section along the axis of the coupling;

Fig. 3 is a transverse section on the line, 3—3, of Fig. 2, looking toward the left;

Fig. 4 is a transverse section on the line, 4, 5—4, 5, of Fig. 2, looking toward the left;

Fig. 5 is a section on the same line, looking toward the right;

Fig. 6 is an elevation looking toward the discharge end of the screw plug.

Referring to said drawings, A is the wall of a bearing into which lubricating grease is to be forced or injected. In said wall is a screw-threaded aperture, $A^1$. A screw plug, B, is threaded into said aperture, its neck, $B^1$, extending outward from the wall, A. On the outer end of said neck is a hexagonal head, $B^2$. Said plug is tubular and has in the outer part of the head an orifice or port, $B^3$, which is of less diameter than the interior of the body of the plug. A valve ball, $B^4$, located within the plug is pressed over said orifice or port by means of an expanding coil spring, $B^5$. The external diameter of the spring is less than the interior diameter of the adjacent parts of the plug. This permits the passing of grease around the spring. At the discharge end of the plug are inward-directed prongs, $B^6$, which form a seat or abutment for that end of the spring. Between those prongs are passages for the escape of grease from the plug around the discharge end of the spring. Those passages are provided for service in the event that pressure of grease against the ball, $B^4$, compresses the coils of the spring against each other, whereby the passing of grease through the spring is prevented. When such full compression of the spring does not take place, the grease may pass both through and around the spring. But, in view of the high pressure under which the grease is in some cases forced into the plug, it is desirable to make this provision for the passage of the grease around the spring. The outer face of the head, $B^2$,—the face which is transverse to the length of the plug—is sufficiently extended to make a seat for the connection or coupling mechanism, as will be hereinafter described.

C is a short tube or neck adapted to be threaded to a pump small enough to be held by the hands of the operator or to a tube or pipe which is joined to a grease pump of such size as to require resting on the ground or floor. On the end of the tube or pipe, C, which is the farther from the pump is a head, $C^1$, in which is a socket or recess, $C^2$, which is cylindrical and on the axial line of said tube and connects directly with said tube. Being on said axial line, all parts of the inner face of the circumferential wall of said socket are equi-distant from said axial line.

But the outer circumferential face of said head is excentric to said axial line, so that a part of said wall is thicker than the opposite part.

Said socket is of proper diameter and depth to receive the head, $B^2$, of the screw plug, the corners of the head meeting the inner face of the socket wall.

A binding ring or sleeve, E, surrounds the head, $C^1$, and is so closely fitted thereto as to merely allow rotation of the ring on the head. At the side of the head toward the neck, C, said ring has a flange, $E^1$, over-lapping the adjacent radial face of the head, $C^1$. At the opposite side of the head, $C^1$, the ring, E, has a flange, $E^2$, extended over the outer radial face of the head, $C^1$. It is immaterial what particular form is given to the flange, $E^1$; for its only function is to hold the ring from moving parallel to the length of the neck, C, away from said neck. But the flange, E², is to perform two functions: (1) to hold the ring, E, from moving parallel to and toward the neck, C, and (2) to engage the head, B², of the screw plug and to press and hold said head in the socket, C². To adapt said flange to perform this second function, said flange is made excentric to the axial line of the neck, C, and the socket, C², whereby said flange is made wider at one part than at the opposite part.

Being thus constructed and rotatable on the head, C¹, the binding ring, E, may be turned to bring the narrow part of the flange, E², opposite the thick part of the circumferential wall of the head, C¹, the wide part of said flange being at the same time brought opposite the thick part of the circumferential wall of the head, C¹. When said binding ring is in that position, the socket, C², of the head, C¹, is unobstructed, and the head, C¹, may be moved toward the screw plug until the head, B², of the plug has entered the socket. Then the binding ring is to be turned approximately half way, whereby the wide part of the flange, E², is made to extend across the thin part of the circumferential wall of the head, C¹, and across the adjacent part of the head, B², of the screw plug, B. Or we may say that the wide part of the flange, E², projects across a part of the socket, C², and to that extent forms a transverse outer wall for the socket, C², whereby the head, B², of the screw plug is held within the said socket.

The several parts are to be so proportioned as to cause the inner faces of the flange, E², to bear firmly against the adjacent transverse face of the head, B², whereby the head is pressed forcibly toward the transverse or radial wall of the head, C¹.

For the purpose of establishing such intimate contact between the head, C¹, and the head, B², as will prevent the passing of grease pressed through the neck or pipe, C, toward the screw plug an annular cutting edge, C³, is formed on the transverse face of the head, C¹, which extends across the transverse face of the head, B², of the screw plug. Said cutting edge is adapted to press through or push aside any foreign matter adhering to the transverse face of the screw plug. This placing of such a cutting edge on one of these heads to bear on the adjacent face of the other head for thus making intimate contact notwithstanding the presence of foreign matter is an important feature in this structure.

When these coupling members have been arranged and adjusted as above described, the passage of grease is from the pump through the neck or pipe, C, and thence through the orifice, B³, around the ball, B⁴, and through the screw plug into the bearing.

When the desired quantity of grease has thus been injected through the screw plug and the grease pressure cut off, the binding ring, E, is to be turned to again bring the wide part of the flange, E², opposite the thick part of the circumferential wall of the head, C¹, and the narrow part of the flange, E², opposite the thin part of said circumferential wall, whereby the socket, C², is left unobstructed for the outward movement of the head, B², of the screw plug. Then the members previously coupled together may be separated from each other.

In lieu of the rotary binding ring above described, any other means may be used for pressing the coupling head to the head of the screw plug.

I claim as my invention,

1. In a coupling structure of the kind described, the combination of a tubular neck having a coupling head in which is a socket larger than the interior of the neck and of the size of a screw plug head and communicating with the interior of the neck and opening to the exterior away from said neck, and the interior of said coupling head having a cutting edge around the opening into said neck, and a binding ring surrounding said coupling head and held for rotation on an axis which is outside of the axis of said tubular neck and which ring has a flange adapted to extend across a part of the opening of said socket when said ring is turned into one position and to be clear of said opening when said ring is turned into another position, substantially as described.

2. In a coupling structure of the kind described, the combination of a tubular neck having a coupling head in which is a socket larger than the interior of the neck and of the size of a screw plug head and communicating with the interior of the neck and opening to the exterior away from said neck, and the interior of said coupling head having a cutting edge around the opening into said neck, and a binding ring surrounding said coupling head and flanged at each end and rotatable on an axis which is outside of the axis of the tubular neck, the flange at one end of the ring being adapted to extend across a part of the opening of said socket when said ring is turned into one position and to be clear of said opening when said ring is turned into another position, substantially as described.

3. In a coupling structure of the kind described, the combination of a tubular neck having a coupling head which has an excentric exterior and has a socket larger than the interior of the neck and of the size of a screw plug head and communicating with the interior of the neck and opening to the exterior away from said neck and the interior of said head having a cutting edge around the opening into said neck, and a binding ring surrounding said coupling head and held for rotation on said head and which ring has a flange adapted to extend across a part of the opening of said socket when said ring is turned into one position and to be clear of the opening of said socket when said ring is turned into another position, substantially as described.

4. In a coupling structure of the kind described, the combination of a screw plug having a head, a tubular neck having a coupling head in which is a socket of larger diameter than the interior of said neck and of size to receive the head of the screw plug and the face of one of said heads having a cutting edge adapted to bear against the adjacent face of the other of said heads, and means surrounding the coupling head and having an inward-directed flange for holding said heads to each other, substantially as described.

5. In a coupling structure of the kind described, the combination of a screw plug having a head, a tubular neck having a coupling head in which is a socket of larger diameter than the interior of said neck and of size to receive the head of the screw plug and the face of one of said heads having a cutting edge adapted to bear against the adjacent face of the other of said heads, and rotary means surrounding the coupling head and having an inward-directed flange for holding said heads to each other, substantially as described.

6. In a coupling structure of the kind described, the combination of a screw plug having a head, a tubular neck having a coupling head in which is a socket of larger diameter than the interior of said neck and of size to receive the head of the screw plug and the face of one of said heads having a cutting edge adapted to bear against the adjacent face of the other of said heads, and a binding ring surrounding said coupling head and held for rotation on an axis which is outside of the axis of said tubular neck and which ring has a flange adapted to extend across a part of the opening of said socket when said ring is turned into one position and to be clear of said opening when said ring is turned into another position, substantially as described.

7. In a coupling structure of the kind described the combination of a screw plug having a head, a tubular neck having a coupling head in which is a socket of larger diameter than the interior of said neck and of size to receive the head of the screw plug and the face of one of said heads having a cutting edge adapted to bear against the adjacent face of the other of said heads, and a binding ring surrounding said coupling head and flanged at each end and rotatable on an axis which is outside of the axis of the tubular neck, the flange at one end of the ring being adapted to extend across a part of the opening of said socket when said ring is turned into one position and to be clear of said opening when said ring is turned into another position, substantially as described.

8. The combination of a member comprising a tubular stem and a cylindrical head having a socket eccentric to said head and of size to receive the head of a screw plug, and a sleeve surrounding the first head and having an eccentric flange and adapted to be turned to leave said socket fully open and to be turned to partially close said socket for engaging and holding the screw plug head in said socket, substantially as described.

In testimony whereof I have signed my name this 25th day of January, in the year one thousand nine hundred and twenty-two.

HUGH W. SANFORD.